(12) United States Patent
Johnson (10) Patent No.: US 8,875,678 B2
(45) Date of Patent: Nov. 4, 2014

(54) SPARK IGNITED RADICAL INJECTION SYSTEM

(71) Applicant: Cameron International Corporation, Houston, TX (US)

(72) Inventor: Everette R. Johnson, Spring, TX (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 0 days.

(21) Appl. No.: 14/043,817

(22) Filed: Oct. 1, 2013

(65) Prior Publication Data

US 2014/0026846 A1 Jan. 30, 2014

Related U.S. Application Data (63) Continuation of application No. 12/944,665, filed on Nov. 11, 2010, now Pat. No. 8,567,369.

(51) Int. Cl.
| | | |
|---|---|---|
| *F02B 19/00* | (2006.01) | |
| *F02B 25/14* | (2006.01) | |
| *F02B 19/10* | (2006.01) | |
| *F02F 1/40* | (2006.01) | |
| *F02B 75/02* | (2006.01) | |

(52) U.S. Cl.
CPC ............... *F02B 19/00* (2013.01); *Y02T 10/125* (2013.01); *F02B 25/14* (2013.01); *F02B 19/1023* (2013.01); *F02B 19/1014* (2013.01); *F02B 19/1009* (2013.01); *F02F 1/40* (2013.01); *F02B 2075/025* (2013.01)
USPC ............ 123/260; 123/261; 123/285; 123/286

(58) Field of Classification Search
USPC ......... 123/260, 261, 268, 285, 286, 1 A, 525, 123/431, 536, 575, 198 A, 540
See application file for complete search history.

(56) References Cited

U.S. PATENT DOCUMENTS

| | | |
|---|---|---|
| 3,092,088 A | 6/1963 | Goossak et al. |
| 3,230,939 A | 1/1966 | Goossak |
| 3,283,751 A | 11/1966 | Goossak et al. |
| 3,802,827 A | 4/1974 | Semenov et al. |
| 4,075,996 A | 2/1978 | Hisserich |
| 4,287,862 A | 9/1981 | Noguchi et al. |

(Continued)

FOREIGN PATENT DOCUMENTS

| | | |
|---|---|---|
| DE | 3429315 A1 | 2/1986 |
| FR | 2539457 A1 | 7/1984 |

(Continued)

OTHER PUBLICATIONS

PCT Search Report and Written Opinion for PCT/US2011/047801, mailed on Nov. 9, 2011.

(Continued)

*Primary Examiner* — Hai Huynh
(74) *Attorney, Agent, or Firm* — Fletcher Yoder, P.C.

(57) ABSTRACT

A system including a free-radical ignition system, including a pre-combustion chamber, an air intake coupled to the pre-combustion chamber, a fuel intake coupled to the pre-combustion chamber, an ignition source coupled to the pre-combustion chamber, a free-radical injection passage coupled to the pre-combustion chamber, and a quench system coupled to the pre-combustion chamber or the free-radical injection passage.

22 Claims, 9 Drawing Sheets

(56) References Cited

U.S. PATENT DOCUMENTS

| | | |
|---|---|---|
| 4,292,935 A | 10/1981 | Wagner |
| 4,294,208 A | 10/1981 | Wagner |
| 4,305,357 A | 12/1981 | Scherenberg et al. |
| 4,320,728 A | 3/1982 | Artman |
| 4,327,681 A | 5/1982 | Latsch et al. |
| 4,332,224 A | 6/1982 | Latsch et al. |
| 4,347,814 A | 9/1982 | Besslein |
| 4,651,703 A | 3/1987 | Hoppie |
| 4,766,855 A | 8/1988 | Tozzi |
| 5,222,993 A | 6/1993 | Crane |
| 5,307,772 A | 5/1994 | Rao et al. |
| 5,662,082 A | 9/1997 | Black et al. |
| 6,116,207 A | 9/2000 | Firey |
| 6,125,813 A | 10/2000 | Louthan et al. |
| 6,571,755 B1 | 6/2003 | Dunn et al. |
| 6,786,716 B1 * | 9/2004 | Gardner et al. ............... 431/268 |
| 6,986,342 B2 * | 1/2006 | Thomas ....................... 123/536 |
| 7,100,567 B1 | 9/2006 | Bailey et al. |
| 7,464,688 B2 | 12/2008 | Yu et al. |
| 7,469,662 B2 | 12/2008 | Thomas |
| 7,493,886 B2 | 2/2009 | Blank |
| 7,497,204 B2 | 3/2009 | Perryman et al. |
| 7,533,655 B2 | 5/2009 | Allen |
| 7,637,254 B2 * | 12/2009 | Plata ............................ 123/538 |
| 8,567,369 B2 * | 10/2013 | Johnson ....................... 123/260 |
| 2006/0037567 A1 | 2/2006 | Thomas |
| 2006/0096570 A1 | 5/2006 | Tourteaux et al. |
| 2007/0137611 A1 | 6/2007 | Yu et al. |
| 2007/0215098 A1 | 9/2007 | Hashimoto et al. |
| 2007/0235002 A1 | 10/2007 | Blank |
| 2008/0017136 A1 | 1/2008 | Sciamanna et al. |
| 2008/0022965 A1 | 1/2008 | Bysveen et al. |
| 2008/0178836 A1 | 7/2008 | Yamashita et al. |
| 2009/0031984 A1 | 2/2009 | Shiraishi et al. |
| 2009/0078228 A1 | 3/2009 | Tsutsumizaki et al. |
| 2009/0114178 A1 | 5/2009 | Coates et al. |
| 2009/0255508 A1 | 10/2009 | Cheiky |
| 2011/0056445 A1 * | 3/2011 | Plata ................................ 123/3 |
| 2011/0108009 A1 * | 5/2011 | Plata ............................ 123/537 |
| 2011/0118957 A1 * | 5/2011 | Plata ............................ 701/103 |
| 2012/0103302 A1 | 5/2012 | Attard |
| 2012/0118263 A1 * | 5/2012 | Patterson ..................... 123/304 |

FOREIGN PATENT DOCUMENTS

| | | |
|---|---|---|
| FR | 2810692 A1 | 12/2001 |
| GB | 2089889 A | 6/1982 |
| JP | 55093968 A | 7/1980 |
| JP | 7127452 A | 5/1995 |
| WO | 00/08317 A1 | 2/2000 |
| WO | 2009/114327 A1 | 9/2009 |

OTHER PUBLICATIONS

International Search Report and Written Opinion for PCT No. PCT/US2011/047795 dated Nov. 9, 2011; 13 pgs.

* cited by examiner

SPARK IGNITED RADICAL INJECTION SYSTEM

CROSS REFERENCE TO RELATED APPLICATION

This application claims priority to U.S. patent application Ser. No. 12/944,665, entitled "Spark Ignited Radical Injection System," filed on Nov. 11, 2010, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since its inception the internal combustion engine has become an important part of everyday life. Internal combustion engines are now used in a wide variety of situations ranging from motor vehicles to machinery. To operate an internal combustion engine, fuel and air are mixed and ignited in a chemical reaction that turns chemical energy into useful mechanical energy. A byproduct of this combustion process can create undesirable byproducts such as carbon monoxide (CO), nitrogen oxides ($NO_x$), and non-methane hydrocarbons (NMHC). These undesirable byproducts can be created when the combustion process fails to burn all of the fuel in the mixture and/or the combustion process takes too long allowing these undesirable byproducts to form. As government agencies tighten restrictions and corporations continue to promote their positive environmental impact, a need exists to create more efficient engines that produce fewer undesirable emissions.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed below, the embodiments provide a free radical injection system that creates and injects free radicals into a combustion chamber to ignite a fuel-air mixture. In particular, a fuel air mixture is ignited in a pre-combustion chamber to create free radicals. The ignition of the fuel air mixture creates free radicals, while simultaneously producing a shock wave that forces the free radicals out of the pre-combustion chamber. Before entering the main combustion chamber, the flame is extinguished with a quench system. By extinguishing the flame, the free radicals become the source of ignition in the main combustion chamber. Furthermore, to ensure properly timed ignition in the main combustion chamber, a controller times the creation and injection of the free radicals.

Figure 1:
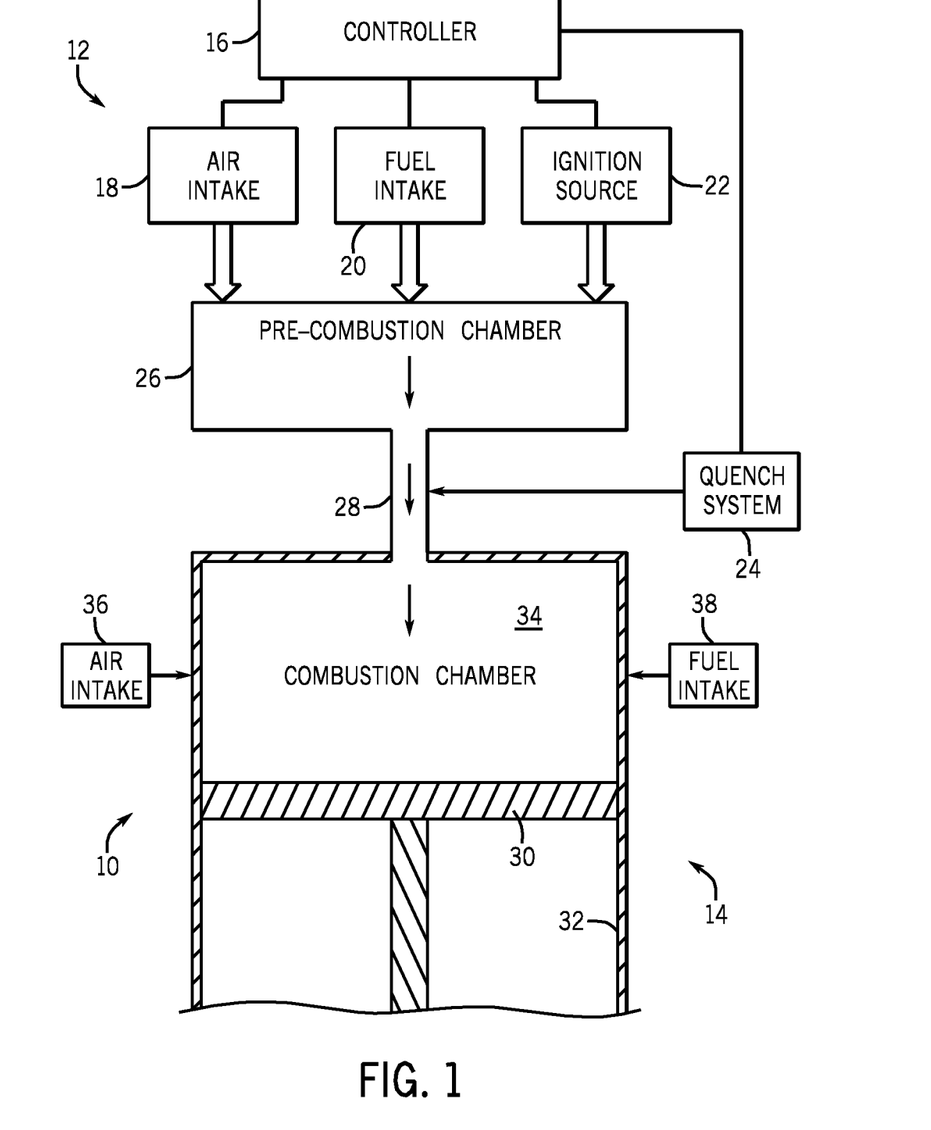
FIG. 1 is a schematic according to an embodiment of a free radical injection system.

FIG. 1 is a schematic of an embodiment of a system 10 having a free radical injection system 12 coupled to a combustion chamber 14. As explained above, the free radical injection system 12 is configured to create and inject free radicals that trigger ignition in the combustion chamber 14. In certain embodiments, the free radicals may include peroxides, aldehydes, monatomic hydrogen, or any combination thereof. As illustrated, the free radical injection system 12 includes a controller 16 coupled to an air intake 18, a fuel intake 20, an ignition source 22, a quench system 24, and a pre-combustion chamber 26. As discussed in detail below, the controller 16 controls the quantity and timing of free radical injection by controlling the ignition of the air and fuel mixture in the pre-combustion chamber 26. In particular, the flame created by ignition of the air and fuel mixture creates free radicals, while simultaneously forming a shockwave. The shockwave pushes the free radicals out of the pre-combustion chamber 26 through a passageway 28 and into the combustion chamber 14. The quench system 24 in combination with the passageway 28 prevents the flame from entering the combustion chamber 14. This prevents the flame from prematurely igniting a fuel air mixture in the combustion chamber 14. For example, the quench system 24 may lower the temperature of the passageway 28 to the point that the flame extinguishes from the loss in energy. Thus, the quench system 24 allows free radicals to travel from the pre-combustion chamber 26 into the combustion chamber 14, while preventing passage of the flame.

As illustrated, the combustion chamber 14 includes a piston 30 disposed in a cylinder 32, such as a piston-cylinder assembly of a combustion engine. For example, the combustion chamber 14 may be one of many combustion chambers of a gasoline fueled engine or a diesel fueled engine. As the piston 30 moves upward within the cylinder 32, the piston 30 compresses a combustion volume 34 having the air and fuel from an air intake 36 and a fuel intake 38. For example, the fuel intake 38 may inject the fuel at one or more times during the upward stroke of the piston 30 as the piston approaches a top dead center position. As this point, the fuel air mixture is at an elevated pressure and an elevated temperature due to the compression by the piston 30. At some time near or after top dead center, the controller 16 is configured to create and inject the free radicals from the pre-combustion chamber 26 to ignite the fuel air mixture in the combustion chamber 14.

The combination of the fuel air mixture, the elevated pressure, the elevated temperature, and the free radicals enables the free radicals to rapidly ignite the fuel air mixture. For example, the free radical injection system 12 may inject one or more streams or dispersed flows of the free radicals into the combustion volume 34, thereby quickly igniting the fuel air mixture via free radical ignition (i.e., without a spark in the combustion chamber 14). It should be noted that the free radical induced ignition and combustion is particularly more rapid than convention ignition mechanisms (e.g., spark ignition or compression ignition), and the rapid nature of the free radical induced ignition and combustion may substantially reduce exhaust emissions.

Figure 2:
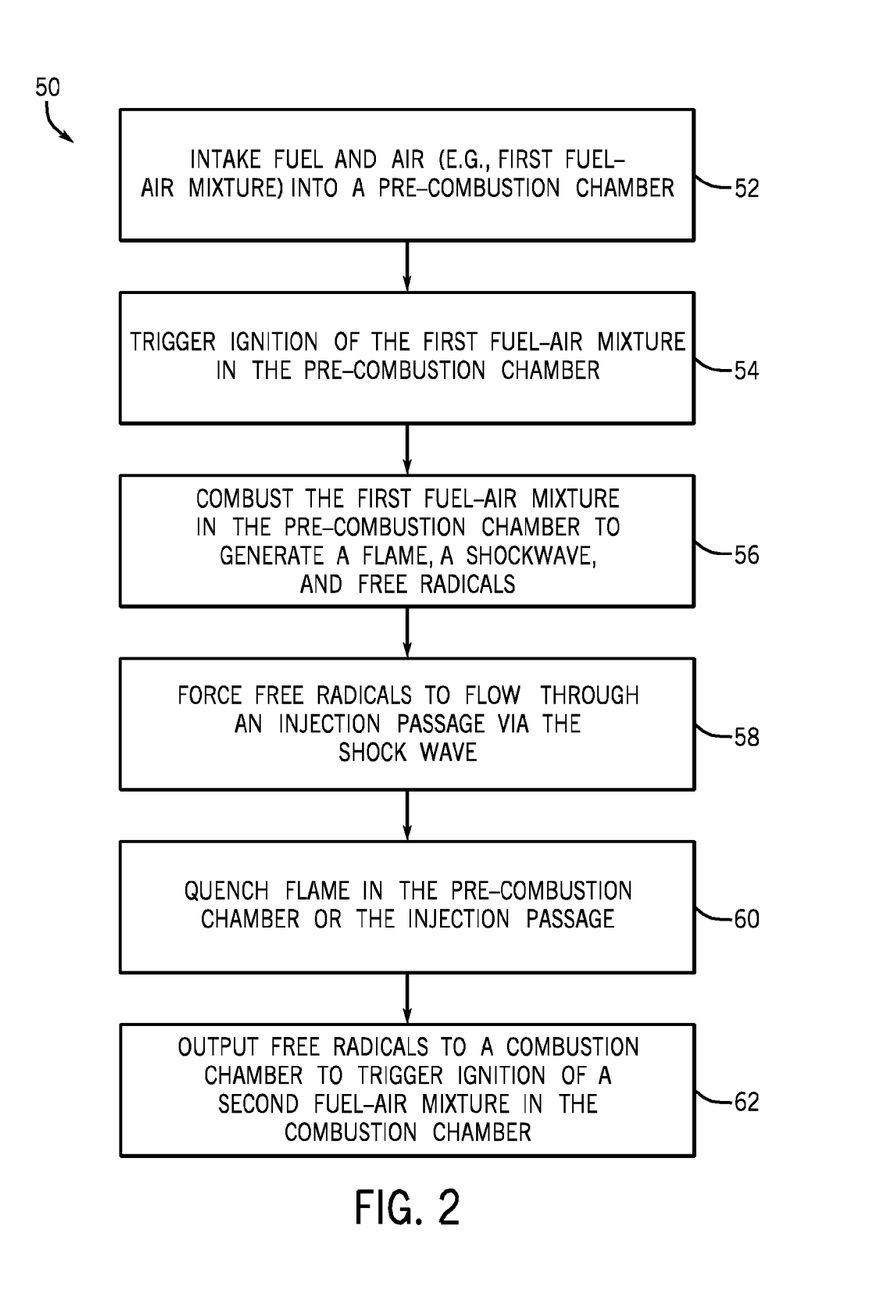
FIG. 2 is a flow chart according to an embodiment of a process for free radical creation and injection into an internal combustion engine.

FIG. 2 is a flow chart of an embodiment of a process 50 for free radical induced combustion in a combustion system. The process 50 begins by intaking fuel and air into a pre-combustion chamber to create a first fuel air mixture (block 52). The process 50 then triggers ignition of the first fuel air mixture in the pre-combustion chamber (block 54). In response to the ignition, the process 50 combusts the first fuel and air mixture to generate a flame, a shockwave, and free radicals (block 56). The process 50 then forces the free radicals to flow through an injection passage via the shockwave (block 58). The process 50 then quenches (e.g., extinguishes) the flame in the injection passage, the pre-combustion chamber, or both (block 60). The process 50 then outputs free radicals to a combustion chamber to trigger ignition of a second fuel air mixture in the combustion chamber (block 62). The ability of the free radicals to promote rapid combustion of the second fuel air mixture limits the creation of undesirable byproducts, such as carbon monoxide (CO), nitrogen oxides ($NO_x$), and non-methane hydrocarbons (NMHC).

Figure 3:
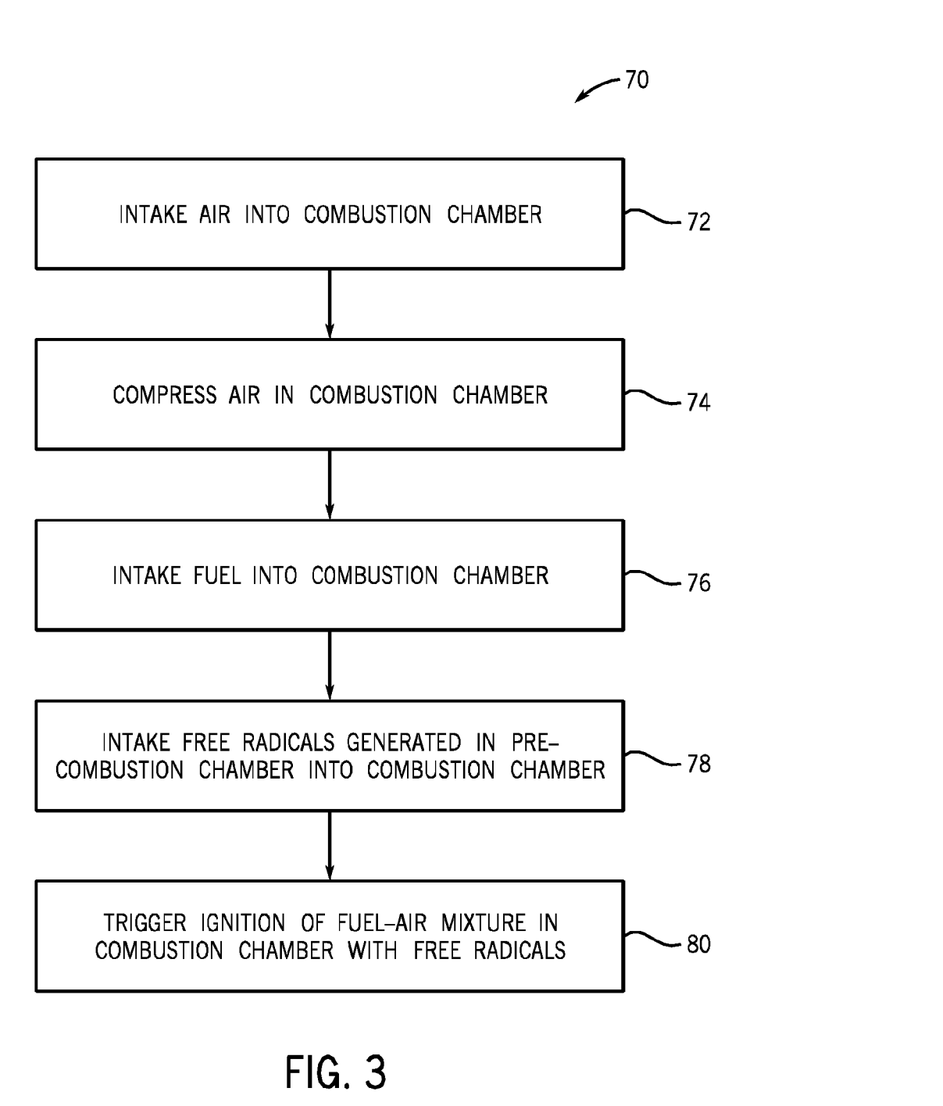
FIG. 3 is a flow chart according to an embodiment of a process for free radical combustion in an internal combustion engine.

FIG. 3 is a flow chart of an embodiment of a process 70 for free radical induced combustion in a combustion system. The process 70 includes an air intake into a combustion chamber (block 72), and a compression of the air in the combustion chamber (block 74). For example, the combustion chamber 14 of FIG. 1 may compress the air via an upward stroke of the piston 30 in the cylinder 32. At an appropriate timing, the process 70 intakes fuel into the combustion chamber (block 76) to enable fuel air mixing within the combustion chamber. For example, the fuel intake may occur during the upward stroke of the piston 30 prior to a top dead center position of the piston 30. At a subsequent timing, the process 70 may intake free radicals, created in the pre-combustion chamber, into the combustion chamber (block 78). For example, the free radicals may be generated by the process 50 of FIG. 2. The free radical intake may occur near, at, or after the top dead center position of the piston 30. Upon injection of the free radicals, the process 70 rapidly triggers ignition of the fuel air mixture in the combustion chamber via the free radicals (block 80). While in the present embodiment fuel intake occurs prior to free radical intake, other embodiments contemplate free radical intake before the fuel intake. In still further embodiments, fuel and free radical intake may occur simultaneously.

In the process 70 of FIG. 3, the free radicals are injected by the shockwave produced by ignition of the fuel air mixture, e.g., as discussed above in the process 50 of FIG. 2. Again, the free radicals may include peroxides, aldehydes, monatomic hydrogen, or any combination thereof. In the presence of the elevated pressure and elevated temperature, the free radicals operate to rapidly ignite the fuel air mixture more uniformly and completely throughout the combustion chamber. The free radicals may be analogized with many small spark plugs distributed throughout the combustion chamber, thereby providing multiple distributed ignition points to improve the combustion process. Accordingly, it may be desirable to provide a uniform injection of the free radicals throughout the combustion chamber. The free radicals provide more complete and uniform combustion, and in a much more rapid manner. As a result, the free radical induced combustion may be substantially more efficient with less undesirable exhaust emissions (e.g., less nitrogen oxides, or $NO_x$) as compared with conventional ignition systems. By using free radicals, rapid ignition and a lower combustion temperature of the fuel/air mixture are possible. These two conditions are unfavorable to NOx production. Furthermore, carbon monoxide production is reduced, due to the more complete and uniform combustion at a lower fuel/air ratio.

Figure 4:
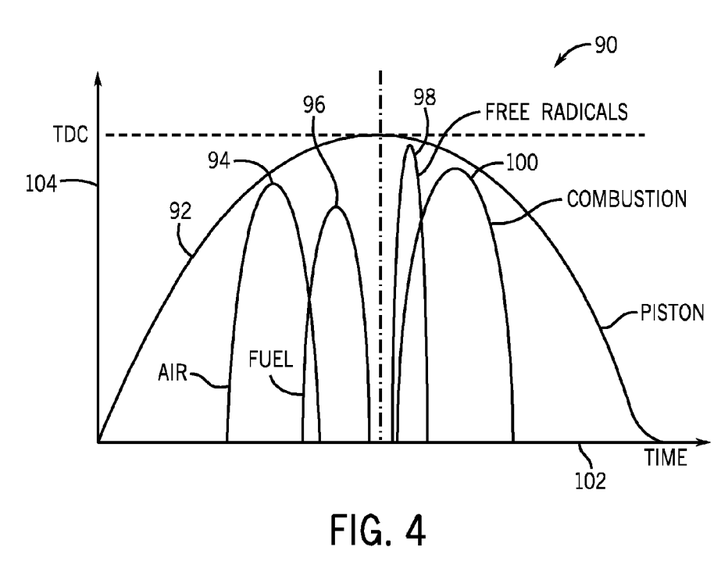
FIG. 4 is a graph according to an embodiment illustrating the timing of the free radical injection system with respect to the position of the piston.

FIG. 4 is a graph of an embodiment of a timing scheme 90 for injection of air, fuel, and free radicals with respect to the position of the piston 30 in the combustion chamber 14 of FIG. 1. As illustrated, the timing scheme 90 includes a piston timing curve 92, an air timing curve 94, a fuel timing curve 96, a free radical timing curve 98, and a combustion timing curve 100. In general, the curves 94, 96, 98, and 100 may occur in order as indicated by a time axis 102, but may temporally overlap with one another during a cycle of the piston 30 as indicated by a piston position axis 104. As illustrated by the piston timing curve 92, the piston 30 moves upward from a bottom dead center (BDC) position to a top dead center (TDC) position, and then back toward the BDC position. During this cycle of the piston 30, the combustion volume 34 compresses during the upward compression stroke toward the TDC position, and then expands during the downward power stroke (or combustion) toward the BDC position.

During the compression stroke, the timing scheme 90 may provide the air to the combustion chamber as indicated by the air timing curve 94, and then subsequently provide the fuel to the combustion chamber as indicated by the fuel timing curve 96. In certain embodiments, the fuel timing curve 96 may include a single injection timing or multiple injection timings, e.g., a pilot fuel injection and a main fuel injection. At, near, or after the TDC position, the timing scheme 90 may provide the free radicals to the combustion chamber as indicated by the free radical timing curve 98. In the illustrated embodiment the free radical timing curve 98 occurs at least slightly after the TDC position of the piston, at least in part due to the rapid ignition and combustion induced by the free radicals. In some embodiments, the free radicals may be injected between approximately 0 to 25, 0 to 20, 0 to 15, or 0 to 10 degrees after the TDC position. For example, the free radicals may be injected at least approximately 1, 2, 3, 4, 5, 6, 7, 8, 9, or 10 degrees after the TDC position. In turn, the timing scheme 90 includes the combustion timing curve 100, which substantially overlaps the free radical timing curve 98. Again, the free radicals rapidly ignite the fuel air mixture in the combustion chamber, and thus the combustion timing curve 100 is shown as starting at or slightly after the start of the free radical timing curve 98. While in the present embodiment, the free radicals are injected at or near TDC position it is understood that free radicals may be injected at BDC position or any position in between.

Figure 5:
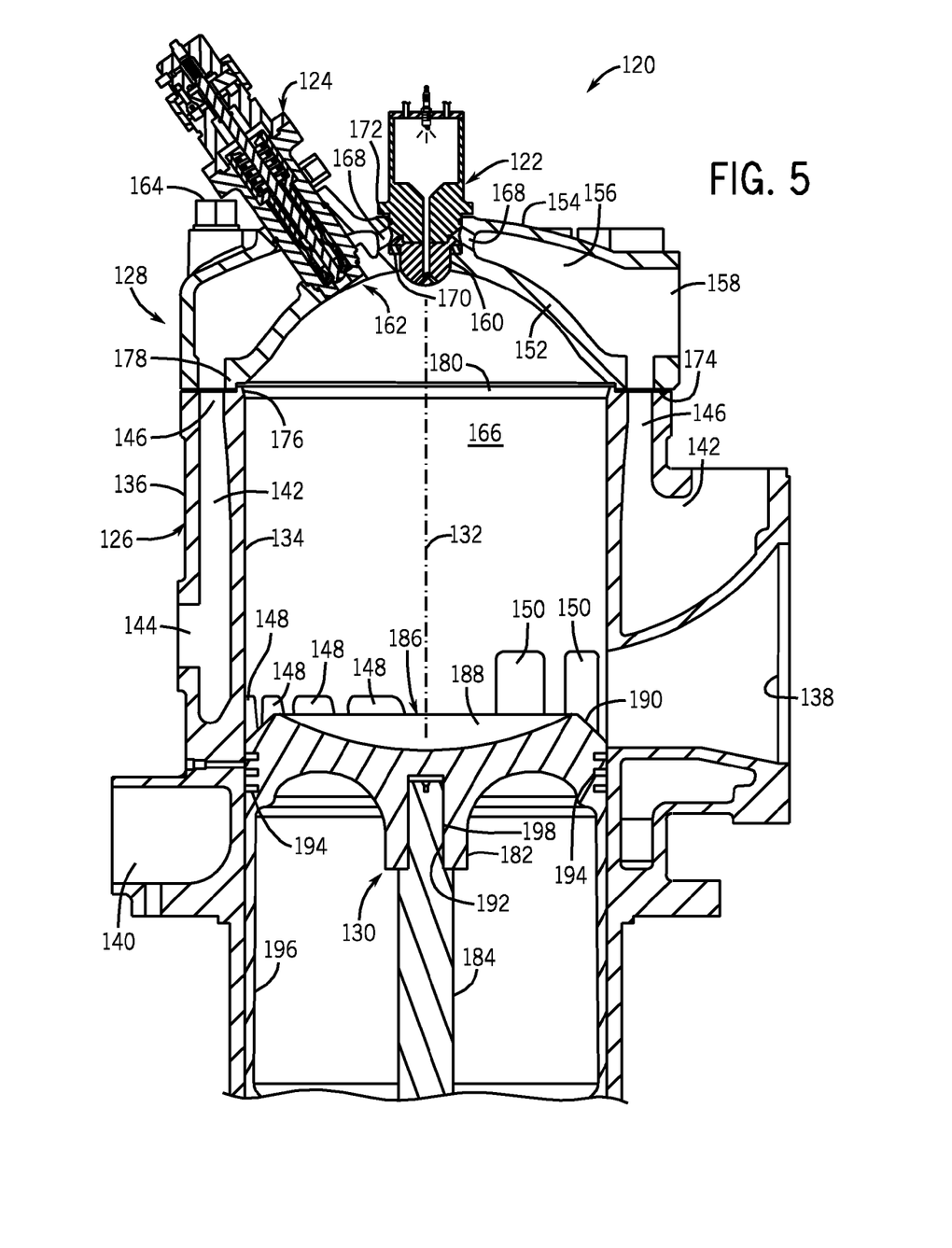
FIG. 5 is a cross-sectional view of an embodiment of a two-stroke engine with a free radical injection device.

FIG. 5 is a cross-sectional view of an embodiment of a two-stroke engine 120 incorporating a free radical injection device 122 configured to provide free radical induced ignition and combustion. In the illustrated embodiment, the engine 120 includes a fuel injector 124, a cylinder 126, a head 128, and a piston assembly 130. The illustrated cylinder 126 is generally concentric about a central axis 132 and includes an inner sidewall 134, an outer sidewall 136, an exhaust outlet 138, and an air inlet 140. The inner sidewall 134 and the outer sidewall 136 are spaced away from each other and together define a cavity 142 for circulating coolant around the inner sidewall 134 and cooling the engine 120. Coolant may flow into or out of the cavity 142 through an aperture 144 in the outer sidewall 136. The cavity 142 may also include a plurality of apertures 146 that place the cavity 142 in fluid communication with portions of the head 128, as described below. The inner sidewall 134 is penetrated by a plurality of passages 148 that converge in the air inlet 140 and a plurality of passages 150 that converge in the exhaust outlet 138. The passages 150 may extend closer to the head 128 than the passages 148 to increase the portion of the piston's stroke during which exhaust gas may flow through the passages 150 relative to the portion of the piston's stroke during which air may flow in through the passages 148. During a down stroke, exhaust gas may first flow out through the passages 150 before air flows into the cylinder 126 through the passages 148 and purges the remaining exhaust. In some embodiments, the cylinder 126 has a bore (diameter) between 10 and 20 inches, e.g., between 14 and 18 inches.

The cylinder 126 couples to the head 128, which also has a shape that is generally concentric about the central axis 132. In this embodiment, the head 128 includes an inner wall 152, an outer wall 154, a cavity 156, a coolant inlet 158, a free radical injection device aperture 160, a gas injection valve aperture 162, and bolts 164. One side of the inner wall 152 defines a generally dome-shaped portion of a main combustion chamber 166, and the space between the inner wall 152 and the outer wall 154 generally defines the cavity 156.

In this embodiment, the cavity 156 is in fluid communication with the coolant inlet 158 and with the coolant outlet 144 through both the apertures 146 and the cavity 142 in the cylinder 126. In some embodiments, the flow may be reversed and inlet 158 may be an outlet. The illustrated cavity 156 includes a plurality of passages 168 that extend to the free radical injection device 122 for cooling the free radical injection device 122. A portion of the cavity 156 also surrounds a part of the fuel injector 124. The cooling of the free radical injection device 122 may quench (e.g., extinguish) the flame used to create the free radicals in the pre-combustion chamber. Consequently, the flame is unable to enter the main combustion chamber 166 to trigger ignition of the fuel air mixture. Accordingly, only the free radicals trigger ignition of the fuel air mixture without any spark or flame as an ignition source.

The illustrated free radical injection device aperture 160 is generally centrally located at the top of the head 128 and is generally concentric about the central axis 132. As explained below, positioning the free radical injection device 122 generally centrally above the main combustion chamber 166 is believed to contribute to a more even propagation of a flame throughout the main combustion chamber 166 and improve engine efficiency. In other embodiments, the free radical injection device 122 and the free radical injection device aperture 160 may be located elsewhere on the head 128 or the engine 120, e.g., to the side of the central axis 132 similar to the gas injection valve 124. The free radical injection device aperture 160 extends between the main combustion chamber 166 and the exterior of the head 128, and it includes a shoulder 170 and a sidewall 172 that abut seals on the free radical injection device 122, as described below. The shoulder 170 and the sidewall 172 may be generally concentric about the central axis 132.

The illustrated bolts 164 extend through the head 128 and thread to the cylinder 126, biasing the head 128 against the cylinder 126. A gasket 174 may be positioned between the head 128 and the cylinder 126, such that it is compressed by the bolts 164. In this embodiment, the head 128 and the cylinder 126 include overlapping flanges 176 and 178. The illustrated flange 176 includes a fillet 180 on the side facing the main combustion chamber 166.

The piston assembly 130 includes a piston 182 and a shaft 184. In some embodiments, the piston 182 includes a crown 186 with a generally dome-shaped portion 188 and a chamfered portion 190, an aperture 192, a plurality of seals 194, and a sleeve 196. The illustrated piston assembly 130 is generally concentric about the central axis 132. The dome-shaped portion 188 of the crown 186 generally defines a segment of a sphere, and the chamfer 190 generally defines a frustoconical volume. The piston 182 is illustrated at or near one end of its stroke, referred to as a bottom dead center. In this position, both the passages 148 and the passages 150 are in fluid communication with the main combustion chamber 166. The aperture 192 includes internal threads that are complementary to external threads on a distal portion 198 of the shaft 184. The illustrated piston assembly 130 includes three piston ring seals 194 that are disposed above the sleeve 196 and below the chamfer 190. Other embodiments may include more or fewer seals 194 or other types of seals. The sleeve 196 is a generally tubular member that is generally concentric about the central axis 132. The sleeve 196 extends a distance along the cylinder 126 such that the sleeve 196 obstructs the passages 148 and 150 when the piston assembly 130 is at the other end of its stroke referred to as top dead center. In some embodiments, the sleeve 196 may be longer than or generally equal to the length of the stroke of the piston assembly 130.

Figure 6:
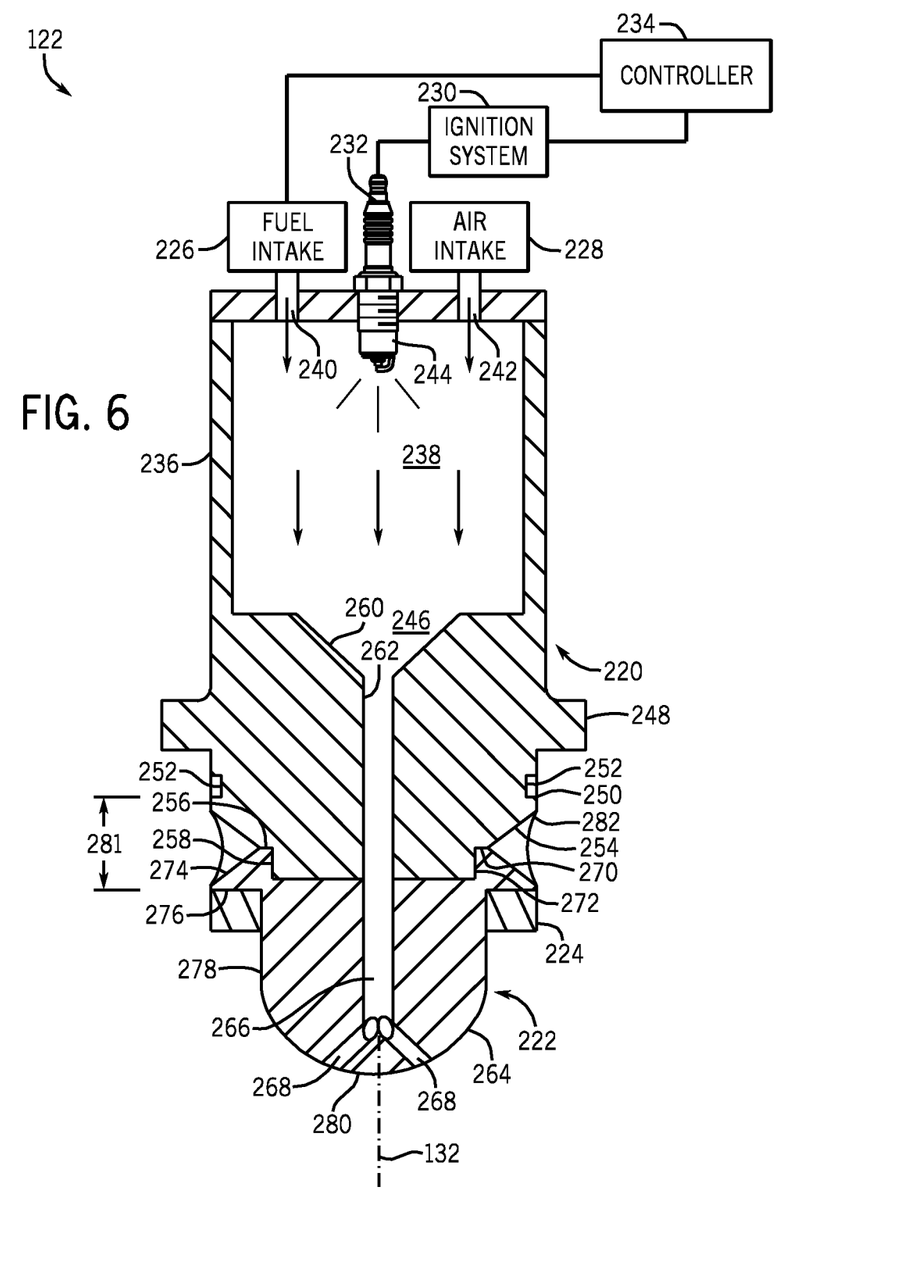
FIG. 6 is a cross-sectional view of an embodiment of the free radical injection device in the engine of FIG. 4.

FIG. 6 is a cross-sectional view of an embodiment of the free radical injection device 122 of FIG. 5. The free radical injection device 122 is configured to create and force free radicals into the combustion chamber 166 at an appropriate ignition timing. In the illustrated embodiment, the free radical injection device 122 includes an upper body 220, a lower body 222, a seal 224, a fuel intake 226, an air intake 228, ignition system 230, spark plug 232, and controller 234. The controller 234 controls the fuel intake 226, air intake 228, ignition system 230, and spark plug 232 to create free radicals. The free radical injection device 122 also forces the free radicals into the main combustion chamber 166 via the shockwave, thereby causing free radical induced ignition in the main combustion chamber 166 without a spark plug, glow plug, or the like.

The upper body 220 of the free radical injection device 122 includes an outer surface 236, a pre-combustion chamber 238, a fuel intake aperture 240, an air intake aperture 242, a spark plug aperture 244, and injection passage 246. The outer surface 236 of the upper body 220 includes a first flange 248, a recess 250, a seal 252 disposed in the recess 250, a chamfer 254, a shoulder 256, and a second flange 258. The seal 252 may be an O-ring or other appropriate type of seal that seals coolant within the cavity 156 of the head 128 (FIG. 5).

The pre-combustion chamber 238 is generally cylindrical and connects to the passage 246. The passage 246 defines a frustroconical top portion 260 and a narrow generally cylindrical bottom portion 262. The frustroconical top portion 260 may assist in directing free radicals into the narrow portion 262 of the passage 246. The passage 246 allows free radicals exiting the pre-combustion chamber 238 to enter the lower body 222 of the free radical injection device 122.

The illustrated lower body 222 includes an outer surface 264, a primary passage 266, and secondary passages 268. The outer surface 264 further defines an upper shoulder 270, a flange 272, a chamfer 274, a lower shoulder 276, a sidewall 278, and a dome 280. The flange 272 and upper shoulder 270 are configured to abut and overlap both the flange 258 and the shoulder 256 of the upper body 220. In this embodiment, a weld 282 joins the chamfer 274 on the lower body 222 to the chamfer 254 on the upper body 220. The illustrated upper body 220 and lower body 222 are cast and then machined separately before being joined permanently by the weld 282. In other embodiments, these components 220 and 222 may be separable and joined with other features, e.g., a threaded connection or bolts. The lower shoulder 276 is generally perpendicular to the central axis 132 (FIG. 5) and abuts the seal 224. The sidewall 278 may define a generally right circular-cylindrical volume and may be generally concentric about the central axis 132. The illustrated dome 280 generally defines a segment of a sphere, e.g., a segment less than a hemisphere. In other embodiments, the dome 280 may be replaced with other shapes, such as a flat surface, a portion of an ellipsoid, or a faceted surface (which is not to suggest that a faceted surface may not also generally define a segment of a sphere or other curved shape).

The primary passage 266 may join the secondary passages 268 at an area that generally lies along the central axis 132, and the secondary passages 268 may be generally rotationally symmetric about the central axis 132. In this embodiment, the secondary passages 268 are at an angle with respect to the central axis 132, which may be between approximately 0 to 110 degrees, 10 to 80 degrees, or 10 to 30 degrees. In other embodiments, the secondary passages 268 may extend in other directions, e.g., generally perpendicular to the central axis 132, radially outward. Both the primary passage 266 and the secondary passages 268 are generally straight, but in other embodiments, they may curve or bend. Both the primary passage 266 and the secondary passages 268 generally define right circular-cylindrical volumes, but in other embodiments, they may generally define other shapes, e.g., a non-right circular-cylindrical volume, an elliptical-cylindrical volume, a rectangular cylindrical volume, a converging volume (e.g., conical), a diverging volume (e.g., conical), or some combination thereof. Additional details of the secondary passages 268 are described below with reference to FIG. 7.

During operation of the free radical injection device 122, the controller 234 is configured to cause the fuel intake 226 and air intake 228 to insert fuel and air into the pre-combustion chamber 238. Once fuel and air is in the pre-combustion chamber 238, the controller 234 signals the ignition system 230 to activate the spark plug 244. Activation of the spark plug 244 creates a spark that ignites the fuel air mixture. Ignition creates a flame that burns the fuel air mixture creating free radicals, while simultaneously creating a shockwave. The shock wave pushes the free radicals in a direction away from the flame and in the direction of the passage 246. The free radicals then travel down the passage 246 into the primary passage 266 and out the secondary passages 268 of the lower body 222. The controller 234 repeats this process each time free radicals are needed in the main combustion chamber 166. Furthermore, the controller 234 carefully times injection and ignition of the fuel air mixture in the pre-combustion 238 in order to properly time the injection of free radicals into the main combustion chamber 166.

To ensure that the free radicals trigger ignition of the fuel air mixture instead of the flame, the flame is extinguished before reaching the main combustion chamber 166. If the flame is not extinguished, then the flame may cause ignition of the fuel air mixture instead of the free radicals. Accordingly, the free radical injection system may employ flame quenching to extinguish the flame. As discussed above, flame quenching may be accomplished by cooling the material surrounding the flame path. For example, the region 281 between the seal 252 and seal 224 may experience significant cooling from coolant traveling through passages 168, as illustrated in FIG. 5. As the flame attempts to travel through this cooler region, the energy from the flame is removed and the flame extinguishes.

Figure 7:
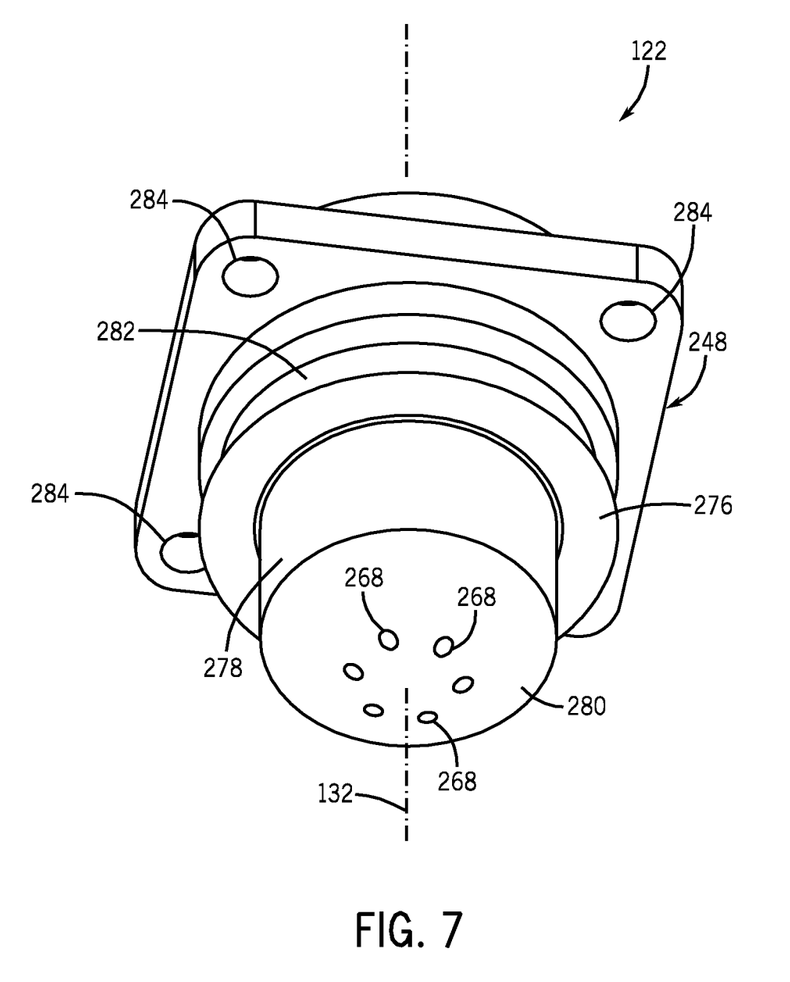
FIG. 7 is a perspective view of an embodiment of the free radical injection device of FIG. 5.

FIG. 7 is a perspective view of an embodiment of the free radical injection device 122. As illustrated, in this embodiment, the features of the free radical injection device 122 are generally concentric about the central axis 132 except the flange 248. The flange 248 defines a generally cuboid volume with chamfered corners. Apertures 284 may be disposed in each of the corners for receiving bolts that secure the free radical injection device 122 to the head 128. In this embodiment, the free radical injection device 122 is secured to the head 128 without directly threading the free radical injection device 122 to the head 128. Bolts extending through the apertures 284 bias the shoulder 276 against the head 128 and restrict movement of the free radical injection device 122 relative to the head 128.

As further illustrated in FIG. 7, the free radical injection device 122 includes six secondary passages 268 to disperse the free radicals in different directions into the combustion chamber 166. In other embodiments, the free radical injection device 122 may include more or fewer secondary passages 268, e.g. 1 to 50, 1 to 25, or 1 to 10 secondary passages 268. For example, the free radical injection device 122 may include at least 1, 2, 3, 4, 5, 6, 7, 8, 9, or 10 secondary passages 268. As illustrated, the secondary passages 268 are generally evenly distributed radially around the central axis 132 at approximately 60 degree intervals. Other embodiments may include additional secondary passages 268 that are at different angles with respect to the central axis 132, e.g., a secondary passage 268 that is generally coaxial with the central axis 132 and another set of secondary passages 234 that are at a larger angle relative to the central axis 132 than the illustrated secondary passages 268. In some embodiments, the secondary passages 268 may exit the dome 280 at several different angles with respect to the central axis 132, e.g., ranging between approximately 0 to 90 degrees. For example, one or more secondary passages 268 may be disposed at angles of approximately 0, 15, 30, 45, 60, and 75 degrees relative to the axis 132. Further, the passages 268 may have varying diameters or shapes. For instance, passages 268 at a larger angle relative to the central axis 132 may have a larger diameter than passages 268 at a smaller angle. While in the present embodiment, the dome 238 defines multiple passages 268, the dome 280 may instead include a conical diffuser in lieu of multiple passages leading into the combustion chamber 166. In still further embodiments, the dome 280 may define a conical diffuser in association with a plurality of passages 268 or perhaps even multiple conical diffusers for venting the free radicals in the combustion chamber. The conical diffuser may have an angle change between approximately 5 to 20 degrees. Regardless, the passageways and diffusers will vary in size, shape, and angles, depending on the size of the combustion chamber 166, velocity suitable to effectively mix the free radicals, and the desired ignition timing of the combustion process. These passages may also contribute to quenching the flame. For example, as the flame travels through these passages, the passages may extinguish the flame due to fluid dynamics, cooling, or a combination thereof.

Figure 8:
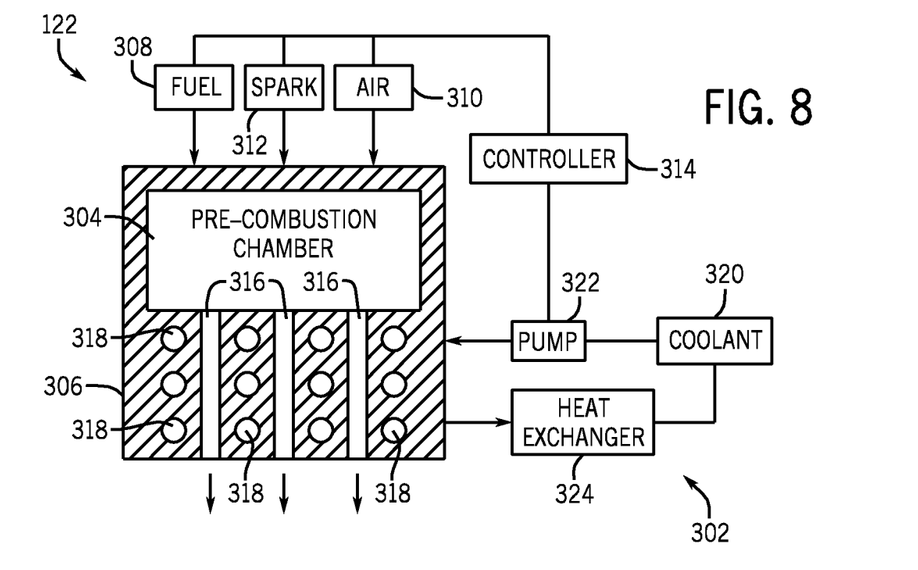
FIG. 8 is a schematic of an embodiment of a free radical injection system.

FIG. 8 is a schematic of an embodiment of a free radical injection system 122. The free radical injection system 122 includes a quench system 302, a pre-combustion chamber 304, injection section 306, fuel intake 308, air intake 310, spark plug 312, and controller 314. As explained above, the controller 314 controls intake of the fuel and air into the pre-combustion chamber 304 through the fuel intake 308 and air intake 310. Once inside the pre-combustion chamber 304, the controller signals the spark plug 312 to ignite the fuel air mixture. The spark ignites the fuel air mixture producing a flame that creates free radicals and a shockwave. The shockwave moves the free radicals through the injection section 306, and into the combustion chamber 166. Specifically, the shockwave moves the free radicals through injection passageways 316.

In order to extinguish flames, the injection section 306 defines coolant passages 318 that enable circulation of a coolant 320 by the quench system 302. The coolant 320 may include a gas or liquid coolant, such as air, water, oil, or another fluid. Accordingly, the coolant passages 318 cool the neighboring injection passages 316. Thus, as the flame travels through the injection passages 316 it loses energy through heat transfer with the coolant 320, causing it to dissipate. In the present embodiment, the injection section 306 includes, twelve coolant passages. However, the injection section 306 may include any number (e.g., 1 to 100) of coolant passages 318. For instance, the free radical injection system 122 may include at least 1, 2, 3, 4, 5, 6, 7, 8, 9, 10, 25, 50, 100, or more coolant passages 318. Furthermore, each of these passages 318 may vary in size, shape, and angle relative to the others, or may be the same, depending on the embodiment. In the illustrated embodiment, the coolant passages 318 coil, wind, or spiral around each of the injection passages 316. For example, the coolant passages 318 may represent an independent spiral passage for each injection passage 316, a single spiral passage or winding passage for all injection passages 316, or any number of spiral passages or winding passages for the injection passages 316.

The quenching system 302 continuously flows the coolant 320 through the coolant passages 318 to cool the injection section 306. In the illustrated embodiment, the quenching system 302 includes a pump 322 and a heat exchanger 324. The pump 322 is configured to pump coolant 320 through the coolant passages 318, while the heat exchanger 324 removes energy absorbed by the coolant 320 in the injection section 306. Thus, a continuous flow of coolant 320 travels through the coolant passages 318 to cool the injection passageways 316. In some embodiments, the controller 314 monitors the temperature of the coolant 320 and/or the injection section 306, and signals the pump 322 to increase or decrease coolant 320 flow depending on the feedback temperature.

Figure 9:
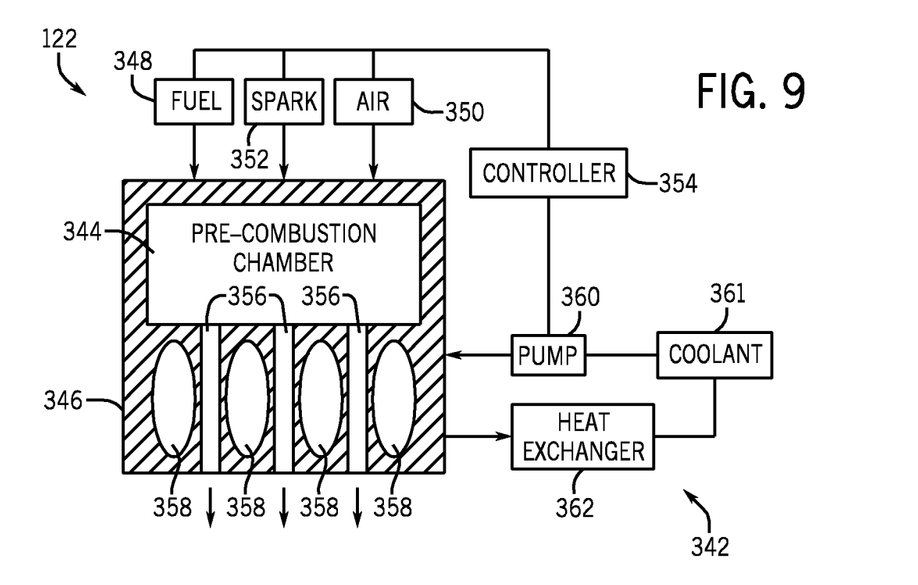
FIG. 9 is a schematic of an embodiment of a free radical injection system.

FIG. 9 is a schematic of an embodiment of a free radical injection system 122. Similar to FIG. 8, the free radical injection system 122 includes a quench system 342, a pre-combustion chamber 344, injection section 346, fuel intake 348, air intake 350, spark plug 352, and controller 354. As explained above, the controller 354 controls air and fuel intake with the fuel intake 348 and air intake 350. Once inside the pre-combustion chamber 344, the fuel air mixture is ignited by the spark plug 352. The spark ignites the fuel air mixture producing a flame that creates free radicals and a shockwave. The shockwave then moves the free radicals through the injection section 346 in a series of injection passages 356.

As mentioned above, the flame that creates the free radicals is extinguished before reaching the main combustion chamber 166. To prevent the flame from passing through the injection passages 356, a series of coolant passages 358 are included in the injection section 346. The coolant passages 358 allow coolant to circulate through the injection section 346, thereby cooling the injection passages 356. As a result, the flames lose enough energy and extinguish. With the flames extinguished, only the free radicals are able to pass into the main combustion chamber 166, thereby enabling free radical induced ignition of a fuel-air mixture in the main combustion chamber 166. As illustrated, two large coolant passages 358 border each injection passage 356, but it is understood that more or less than two large coolant passages 358 may border each injection passage 356. Furthermore, each of these passages 356 may vary in size and shape with respect to the others, or may be the same, depending on the embodiment. In the illustrated embodiment, the coolant passages 358 extend around the injection passages 356, thereby providing cooling around the entire circumference of each injection passage 356. Furthermore, the coolant passages 358 may be independent or integral with one another. For example, the coolant passages 358 may represent a common coolant passage or single coolant chamber that encompasses all of the injection passages 356.

The quench system 342 includes a pump 360 and heat exchanger 362 to provide continuous cooling of the injection passages 356. The pump 360 continuously pumps coolant 361 through the coolant passages 356 to prevent the injection passages 358 from reaching a threshold temperature that may allow a flame to pass into the main combustion chamber 166. While the pump 360 flows the coolant 361, the heat exchanger 362 removes energy from the coolant 361 to maintain a sufficiently low temperature in the injection section 346. As a result, the pump 360 and heat exchanger 362 work together to provide a continuous supply of coolant 361 for the free radical injection system 122.

Figure 10:
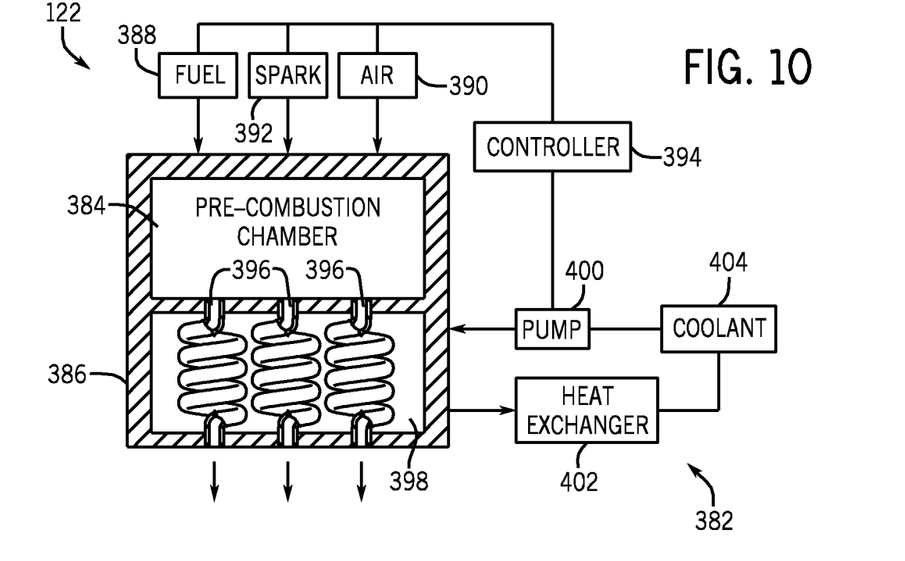
FIG. 10 is a schematic of an embodiment of a free radical injection system.

FIG. 10 is a schematic of an embodiment of a free radical injection system. Similar to FIGS. 8 and 9, the free radical injection system 122 includes a quench system 382, a pre-combustion chamber 384, injection section 386, fuel intake 388, air intake 390, spark plug 392, and controller 394. As explained above, the controller 394 controls the intake of fuel and air into the pre-combustion chamber 384 through operation of the fuel intake 388 and air intake 390. Once the fuel and air mixture is in the pre-combustion chamber 384, the controller 394 times ignition of the mixture through activation of the spark plug 392. Ignition of the mixture produces a flame that creates free radicals and a shockwave, which drives the free radicals through injection passages 396 (e.g., winding injection tubes).

As in the previous embodiments, the flame is extinguished before reaching the main combustion chamber 166. In order to quench the flame, the injection section 386 defines a coolant chamber 398 containing coolant 404. Thus, the injection passages 396 are completely surrounded by the coolant 404 in the coolant chamber 398. For example, the injection passages 396 may be injection tubes, which are separately formed and mounted in the injection section 386. The coolant 404 in chamber 398 removes energy from the injection passages 396; thus, as the flames travel through the injection passages 396 energy is removed and the flames extinguish. In the illustrated embodiment, the injection passages 396 have a helical, spiral, or winding shape, which increases the length of the coolant flow path and increases the surface area for heat transfer. As a result, the spiral injection passage 396 may be relatively cooler than a straight injection passage 396. In other embodiments, the injection passages 396 may include other non-linear shapes, such as zigzags, waveforms, or various waves. As a result, the injection passages 396 remove enough energy to extinguish the flames within the injection passages 396, thereby enabling free-radical induced ignition (i.e., without flame) in the main combustion chamber 166.

The coolant chamber 398 continually replaces the coolant 404 via the quench system 382. The quench system 382 includes a pump 400 and heat exchanger 402. The pump 400 continuously pumps coolant 404 through the coolant chamber 398 to prevent the injection passages 396 from reaching a threshold temperature that may allow a flame to pass into the main combustion chamber 166. While the pump 400 flows the coolant 404 into the coolant chamber 398, the heat exchanger 402 removes energy from the coolant 404 downstream of the coolant chamber 398. As a result, the pump 400 and heat exchanger 402 work together to provide a continuous supply of coolant 404 for the free radical injection system 122.

Figure 11:
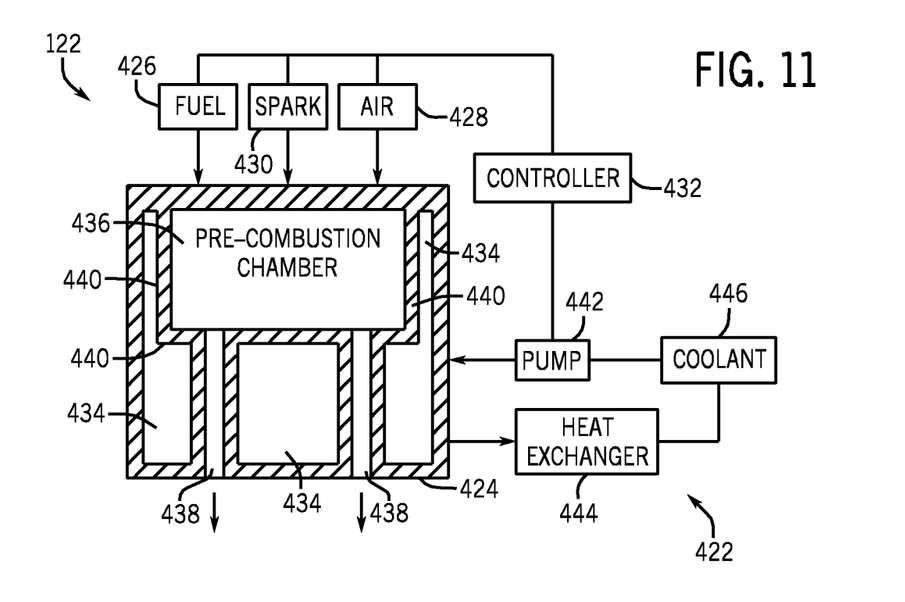
FIG. 11 is a schematic of an embodiment of a free radical injection system.

FIG. 11 is a schematic of an embodiment of a free radical injection system 122. Similar to FIGS. 8-10, the free radical injection system 122 includes a quench system 422, an outer shell 424, a fuel intake 426, air intake 428, spark plug 430, and controller 432. The outer shell 424 further defines a coolant chamber 434. Inside the coolant chamber 434 is a pre-combustion chamber 436 and injection passages 438. The injection passages 438 extend from the pre-combustion chamber 436 through the coolant chamber 434, and then exit the outer shell 424 toward the main combustion chamber 166. As explained above, the controller 432 controls the intake of fuel and air into the pre-combustion chamber 436 through operation of the fuel intake 426 and air intake 428. Once the fuel and air mixture is in the pre-combustion chamber 436, the controller 432 times ignition of the mixture through activation of the spark plug 430. Ignition of the mixture produces a flame that creates free radicals and a shockwave, which drives the free radicals through injection passages 438.

As in the previous embodiments, the flame is extinguished before reaching the main combustion chamber 166. As illustrated in FIG. 10, the coolant chamber 434 contains coolant 446 for quenching flames in the pre-combustion chamber 436 and/or the injection passages 438. The coolant 446 in chamber 434 extinguishes the flames by removing sufficient energy (e.g., heat), such that the flames cannot be sustained. In the illustrated embodiment, the coolant chamber 434 surrounds both the pre-combustion chamber 436 and the injection passages 439, rather than surrounding only the injection passages 438. For example, the coolant chamber 434 extends between the outer shell 424 and an inner wall 440, which surrounds the pre-combustion chamber 436. As a result, the embodiment of FIG. 11 is configured to quench the flame in combustion chamber 436, the injection passages 438, or a combination thereof.

The quench system 422 continuously replaces the coolant 446 in coolant chamber 434. The quench system 422 includes a pump 442 and heat exchanger 444. The pump 442 continuously pumps coolant 446 through the coolant chamber 434 to prevent the pre-combustion chamber 436 and the injection passages 438 from reaching a threshold temperature that may allow a flame to pass into the main combustion chamber 166. Like the embodiments above, the pump 442 moves coolant 446 and the heat exchanger removes energy from coolant 446 as it exits the coolant chamber 434. As a result, only the free radicals without a flame reach the main combustion chamber 166, wherein the free radicals trigger ignition of a fuel air mixture without any other ignition source (e.g., without a spark, flame, etc.).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a free-radical ignition system, comprising:
   a pre-combustion chamber;
   an air intake port coupled to the pre-combustion chamber;
   a fuel intake port coupled to the pre-combustion chamber;
   an ignition source coupled to the pre-combustion chamber; and
   a free-radical injection passage coupled to the pre-combustion chamber.

2. The system of claim 1, comprising a quench system coupled to the pre-combustion chamber or the free radical injection passage.

3. The system of claim 2, wherein the quench system comprises at least one coolant path disposed along the free-radical injection passage.

4. The system of claim 3, wherein the at least one coolant path comprises a coolant coil disposed about the free-radical injection passage.

5. The system of claim 3, wherein the at least one coolant path comprises a coolant chamber disposed about the free-radical injection passage.

6. The system of claim 2, wherein the quench system comprises a heat exchanger.

7. The system of claim 1, wherein the ignition source comprises a spark plug.

8. The system of claim 1, wherein the free-radical injection system is configured to force the free radicals into the combustion chamber at an ignition timing to trigger combustion of a second fuel-air mixture in the combustion chamber.

9. The system of claim 1, wherein the free-radical injection passage comprises a winding passage.

10. The system of claim 1, comprising a plurality of free-radical injection passages coupled to the pre-combustion chamber, and a quench system coupled to the pre-combustion chamber or the plurality of free-radical injection passages.

11. The system of claim 10, wherein the quench system comprises a coolant chamber, and the plurality of free-radical injection passages comprises a plurality of free-radical injection tubes extending through the coolant chamber.

12. The system of claim 11, wherein the plurality of free-radical injection tubes comprises a plurality of winding free-radical injection tubes.

13. The system of claim 1, comprising an engine having a combustion chamber and the free-radical ignition system, wherein the free-radical injection passage is coupled to the combustion chamber.

14. The system of claim 13, comprising a pump or a compressor driven by the engine.

15. The system of claim 1, wherein the free radicals comprise peroxides, aldehydes, or a combination thereof.

16. A system, comprising:
   a free-radical ignition controller comprising:

control to ignite a fuel with an air in a pre-combustion chamber;

control to inject a flow having free radicals from the pre-combustion chamber to a combustion chamber; and control to quench the flow having the free-radicals.

17. The system of claim 16, wherein control to quench comprises extinguishing a flame formed by igniting the fuel with the air.

18. The system of claim 16, wherein the free radicals comprise peroxides, aldehydes, or a combination thereof.

19. A method, comprising:

injecting air from an air intake port directly into a pre-combustion chamber;

injecting fuel from a fuel intake port directly into the pre-combustion chamber;

igniting, via an ignition source, the fuel with the air;

injecting a flow having free-radicals from the pre-combustion chamber to a combustion chamber.

20. The method of claim 19, comprising quenching, via a quench system, the flow having the free radicals.

21. The method of claim 20, wherein quenching comprises extinguishing a flame formed by igniting the fuel with the air.

22. The method of claim 20, wherein quenching comprises flowing a coolant along an injection passage, and the injection passage extends from the pre-combustion chamber to the combustion chamber.

\* \* \* \* \*